(12) United States Patent
Joshi et al.

(10) Patent No.: US 7,417,752 B2
(45) Date of Patent: Aug. 26, 2008

(54) METHOD AND SYSTEM FOR CUSTOMIZED MAIL PIECE PRODUCTION UTILIZING A DATA CENTER

(75) Inventors: Uday W. Joshi, Wilton, CT (US); Richard Mould, Greenwich, CT (US)

(73) Assignee: Pitney Bowes Inc., Stamford, CT (US)

( * ) Notice: Subject to any disclaimer, the term of this patent is extended or adjusted under 35 U.S.C. 154(b) by 1516 days.

(21) Appl. No.: 09/898,232

(22) Filed: Jul. 2, 2001

(65) Prior Publication Data

US 2003/0004824 A1    Jan. 2, 2003

(51) Int. Cl.
*G06F 3/12* (2006.01)
*G06F 15/00* (2006.01)
*G06K 1/00* (2006.01)

(52) U.S. Cl. .................... 358/1.15; 358/1.18; 705/26; 414/791.2; 414/796.1

(58) Field of Classification Search .............. 705/26, 705/27; 283/11, 106, 61–62, 116, 56, 82–83; 229/92.3, 92.8, 301; 358/1.15, 1.18; 462/19, 462/25, 26; 414/801, 791.2, 796.1; *G06F 15/00; G06K 1/00; B65G 59/06*
See application file for complete search history.

(56) References Cited

U.S. PATENT DOCUMENTS

| | | | | | |
|---|---|---|---|---|---|
| 3,640,426 | A | * | 2/1972 | Hammer | 221/67 |
| 3,690,476 | A | * | 9/1972 | Stacy | 414/796.1 |
| 4,396,334 | A | * | 8/1983 | Byrt | 414/791.2 |
| 4,966,521 | A | * | 10/1990 | Frye et al. | 414/788.8 |
| 4,971,513 | A | * | 11/1990 | Bergerioux et al. | 414/807 |
| 5,095,682 | A | * | 3/1992 | Steidinger | 53/411 |
| 5,199,924 | A | * | 4/1993 | Fitzgibbons | 462/26 |
| 5,556,254 | A | * | 9/1996 | Darcy et al. | 414/798.1 |
| 5,769,457 | A | * | 6/1998 | Warther | 283/61 |

(Continued)

FOREIGN PATENT DOCUMENTS

EP        132857    A    *    2/1985

(Continued)

OTHER PUBLICATIONS

From findarticles.com, Leadership, partnerships and Innovation solidify picturevision's position . . . , Feb. 3, 2000, Business Wire, se pp. 1-6.*

(Continued)

*Primary Examiner*—Cuong H. Nguyen
(74) *Attorney, Agent, or Firm*—Brian A. Lemm; Angelo N. Chaclas

(57) ABSTRACT

A system and method for preparing mail pieces is disclosed. A business provides one or more designs for a mail piece to a data center, which converts the designs to a format suitable for viewing via an on-line network connection utilizing a browser. A custom Web site for the business is created and accessed by the business's employees. A defined design for a mail piece is selected, information to be included on the mail piece is provided, and a mailing list is provided to the data center. Multiple requests for mailings are combined by the data center into a single print run and arranged in a presort sequence to allow for postal discounts. The aggregated mailing is printed, and the entire mailing is mailed by the data center.

10 Claims, 3 Drawing Sheets

U.S. PATENT DOCUMENTS

| | | | |
|---|---|---|---|
| 5,781,823 A * | 7/1998 | Isobe et al. | 399/2 |
| 5,836,622 A * | 11/1998 | Fabel | 283/62 |
| 5,873,073 A | 2/1999 | Bresnan et al. | 705/410 |
| 5,881,233 A * | 3/1999 | Toyoda et al. | 709/233 |
| 5,890,152 A | 3/1999 | Rapaport et al. | |
| 5,960,412 A | 9/1999 | Tackbary et al. | 705/27 |
| 5,982,994 A * | 11/1999 | Mori et al. | 358/1.15 |
| 6,022,186 A * | 2/2000 | Crowley | 414/796.1 |
| 6,044,352 A | 3/2000 | Deavers | |
| 6,113,344 A * | 9/2000 | Crowley | 414/801 |
| 6,131,010 A * | 10/2000 | Kume et al. | 399/333 |
| 6,142,531 A * | 11/2000 | Harris, II | 283/74 |
| 6,209,779 B1 * | 4/2001 | Fabel | 229/92.3 |
| 6,257,624 B1 * | 7/2001 | Fabel | 283/62 |
| 6,427,005 B2 | 7/2002 | Toyoda et al. | |
| 6,533,324 B2 * | 3/2003 | Zorn | 283/56 |
| 6,583,852 B2 * | 6/2003 | Baum et al. | 355/40 |
| 2001/0011287 A1 | 8/2001 | Goto et al. | |
| 2001/0032106 A1 | 10/2001 | Smith et al. | |
| 2001/0034618 A1 | 10/2001 | Kessler et al. | |
| 2001/0037209 A1 | 11/2001 | Tarbutton et al. | |
| 2002/0049792 A1 | 4/2002 | Wilcox et al. | |
| 2002/0078158 A1 | 6/2002 | Brown et al. | |
| 2002/0091570 A1 | 7/2002 | Sakagawa | |
| 2002/0133516 A1 | 9/2002 | Davis et al. | |
| 2003/0004824 A1 * | 1/2003 | Joshi et al. | 705/26 |
| 2004/0085580 A1 * | 5/2004 | Kelleher et al. | 358/1.18 |

FOREIGN PATENT DOCUMENTS

| | | | |
|---|---|---|---|
| EP | 343105 A * | 11/1989 | |
| EP | 2258191 A * | 2/1993 | |
| EP | 903222 A2 * | 3/1999 | |
| EP | 1236580 A2 * | 9/2002 | |
| FR | 2724747 A1 * | 3/1996 | |
| JP | 07064482 A * | 3/1995 | |
| JP | 08183247 A * | 7/1996 | |
| JP | 2002052761 A * | 8/2000 | |

OTHER PUBLICATIONS

Don Green, Selling new technology, Paperboard Packaging, Jun. 2002, see pp. 1-3.*

Catherine Lacroix, New York's gray lady takes to living color, MacWEEK, Jan. 5, 1998, see pp. 1-4.*

Ann Marie Mohan, Digital printing cheers wine-maker (wine labels used by China Bend Vineyards), Packaging Digest, Oct. 2001, see pp. 1-5.*

Debora Toth, Big press report: Functions Follow Format, Graphic Arts Monthly, Dec. 2000, see pp. 1-6.*

From findarticles.com, Copiers can be connected to a network of desktop PCs, Purchasing, May 21, 1998, pp. 1-3.*

Debora Toth, The hot perfectors: one-pass, two-side printing is reaching fever pitch in the commercial sheetfed world, raising the competitive bar regarding productivity, versatility, and quality, Graphic Arts Monthly, Aug. 1999 (http://www.findarticles.com).*

Debora Toth et al., Half-size, two sides: multicolor perfectors (printing machinery manufacturers discuss demand for their products), Graphic Arts Monthly, Oct. 2002 (from http://www.findarticles.com).*

Roger Ynostroza, Perfecting quality (Williamson Printing Corp.), Graphic Arts Monthly, Aug. 1999 (from http://www.findarticles.com.*

Debora Toth, One-pass: productivity jars sheetfed market, Graphic Arts Monthly, Feb. 1998 (from http://www.findarticles.com).*

IPI print: post card printing—provide full color design and printing of post cards. Features full color on both sides and printing on 12 point card stock in any size and quantity.*

General tools—Is there a utility that will make it easy to print documents using both sides of the paper?*

AAA full color business cards—two-sided, full-color business cards are printed on 14 pt stock, with high-gloss coating on both sides. Request free sample business cards.*

Unknown, Copiers can b connected to a network or destop PCs, Purchasing, May 21, 1998 (3 pages from http://www.findarticles.com).*

Masatoshi Tanabe, Printer adapter for LAN as "Third Box" for containing printers, Nikkei Communications, Feb. 1, 1993.*

Shinichi Tsuchiya, Page printers for direct connections to net, Nikkei Communications, Oct. 4, 1993.*

* cited by examiner

METHOD AND SYSTEM FOR CUSTOMIZED MAIL PIECE PRODUCTION UTILIZING A DATA CENTER

FIELD OF THE INVENTION

The invention disclosed herein relates generally to mail piece production, and more particularly to a system and method for producing mail pieces for direct mail advertising utilizing a data center.

BACKGROUND OF THE INVENTION

In today's highly competitive business world, advertising to customers, both potential and previous, is a necessity. A business bears the expenses of advertising to inform, persuade or remind target buyers of the business' goods, services or goodwill, with the ultimate goal being that an advertisement will result in the sale of the goods or services. Additionally, many businesses desire to thank customers for recent purchases and offer additional related goods or services to the customer, thereby promoting customer loyalty.

One method for such advertising is by direct mail. There are many different ways a business, both large and small, can conduct an advertising campaign using direct mailings. Suppose, for example, a large company has multiple satellite offices or franchises located in different geographic areas, but requires each office to utilize the same style and look for its advertising to retain a single corporate identity. Typically, the company's marketing department will design a standard mailing and make the design files available to the sales representatives in each of the satellite offices. The sales representative will select a design, customize the file by adding contact information, and print the desired number of copies. Alternatively, the sales representative may also use a commercial printing service to print the mailing. Once the mailing has been printed, the sales representative must address the mailing and apply the proper postage to produce a finished mail piece. The finished mail piece can then be sent to the intended recipient.

There are problems, however, with the generation and sending of conventional direct mailings as described above. For example, there is the risk that a sales representative will make unauthorized changes to the design of the mail piece before printing, thereby removing any uniformity in design between the different satellite offices. Additionally, the printing of the mailing by the sales representative may be time consuming, and the quality of the finished mail piece is limited by the performance of the equipment upon which the mail piece is printed. Additionally, a small number of mailings each year may not justify the expense of maintaining the mailing, shipping and printing equipment in house. While the use of a commercial printing service can eliminate the need to maintain such equipment and ensure a high quality product, the use of such a service may be cost prohibitive, especially for a mailing that does not contain a large number of pieces. Furthermore, the sales representative may not be able to take advantage of postal discounts for mailing rates if the mailing is not pre-sorted or does not contain a sufficient number of pieces.

Thus, there exists a need for an economical and efficient method and system for mail piece production that reliably controls the format and design of the mail pieces.

SUMMARY OF THE INVENTION

The present invention alleviates the problems associated with the prior art and provides a system and method for businesses to prepare mail pieces for direct mailings in which the format and design of the mail pieces are centrally controlled and preparation of the mail pieces is both economical and time efficient.

In accordance with the present invention, a business provides one or more designs for a mail piece to a data center. The business defined designs are converted to a format suitable for viewing via an on-line network connection utilizing a browser. A custom Web site for the business is created, which is accessible by the business's employees. The employees can select a business defined mail piece design for a mailing, provide additional information to be included on each of the mail pieces in the mailing, and upload a recipient mailing list to the data center or specify targeting criteria for a recipient mailing list provided by the data center. Multiple requests for mailings, from the same business or from different businesses, that are received by the data center within a predetermined time period are combined by the data center into a single print run and presorted to allow for postal discounts. The mail pieces are printed, and the entire mailing is mailed by the data center.

By utilizing the system of the present invention, a business can maintain central control over the look and style of mailings sent by branch offices or franchises, thereby maintaining corporate uniformity. The use of a Web site and the data center provides easy access for any authorized employee to request a mailing. Additionally, by combining requests for mailings from multiple parties, the aggregated mailing can qualify for postal discounts, thereby reducing the costs to each of the parties. Furthermore, the use of the data center for printing the mail pieces provides higher quality finished mail pieces.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
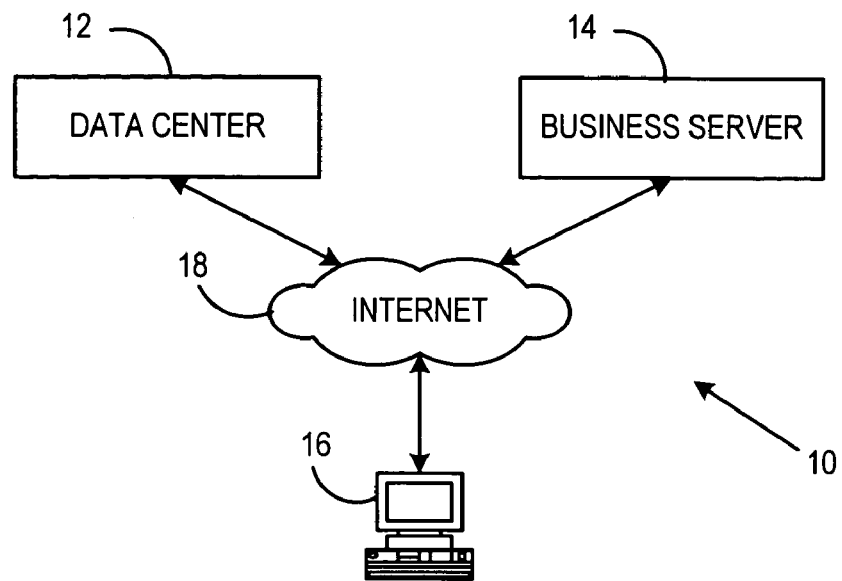
FIG. 1 illustrates in block diagram form a system according to the present invention.

In describing the present invention, reference is made to the drawings, wherein there is seen in FIG. 1 an interactive system 10 for producing direct mailings according to the present invention. System 10 includes a data center 12 and a remote computer 16 operatively coupled to a network, such as, for example, the Internet 18. Data center 12 is preferably operated as a Web server that is accessible by remote computer 16 via the Internet 18. It should be understood that while only one remote computer 16 is illustrated, system 10 may actually include numerous remote computers. System 10 may also include a server 14 operated by a business that is also operatively coupled to the Internet 18. Remote computer 16 includes and executes a Web browser software application, which allows the remote computer 16 to access Hypertext Markup Language (HTML) Web pages and other data on various Web servers, such as data center 12 and server 14. Remote computer 16 therefore provides access to data center 12 for the production of mail pieces as will be further described below.

Figure 2:
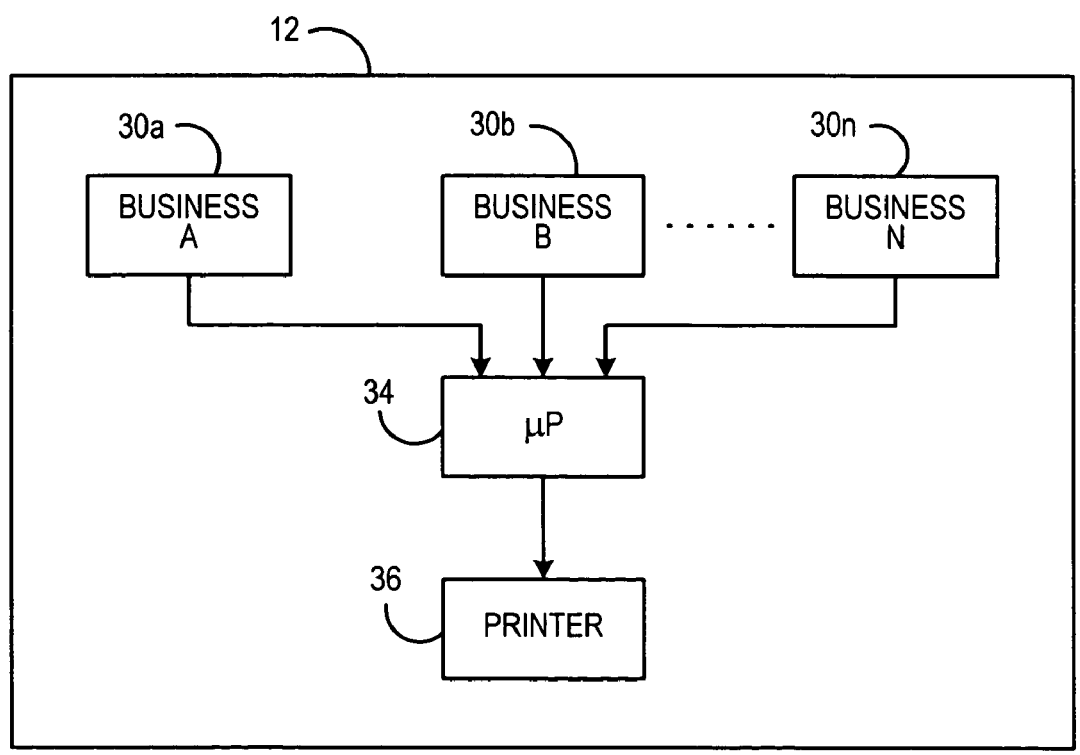
FIG. 2 illustrates in block diagram form a data center according to the present invention.

Referring now to FIG. 2, there is shown a data center 12 according to the present invention. Data center 12 includes a microprocessor 34 for controlling operation of the data center 12 and production of mail pieces. Data center 12 includes a plurality of data bases 30a, 30b, 30n used to store information relative to a specific business or company, such as, for example, business A, business Bb and business N. Each data base 30a-30n includes Web pages accessible via remote computer 16. Each Web page is based on a design for a mail piece submitted by the business. Alternatively, each data base 30a-30n includes stored component information that is used to dynamically assemble a Web page when requested via remote computer 16. Thus, for example, business A will submit one or more designs or components for a design for the look and style of a mail piece to data center 12. The designs from business A will be converted into a format suitable for viewing on-line, such as, for example, an GIF image, via a Web browser, and stored in data base 30a. Business B and business N will similarly supply their own designs for mail pieces to data center 12, which will be converted into a format suitable for viewing on-line and stored in data base 30b and 30n, respectively. As noted above, the Web pages created by data center 12 can be accessed and viewed by a remote computer 16 via the Internet 18.

Data center 12 also includes a printer 36 for printing the direct mail pieces. Printer 36 is preferably a high performance printer, such as, for example, a digital printer. Printer 36 is operatively coupled to microprocessor 34 which controls the printing of graphics and text as defined by user selections from the Web pages referenced above.

Figure 3:
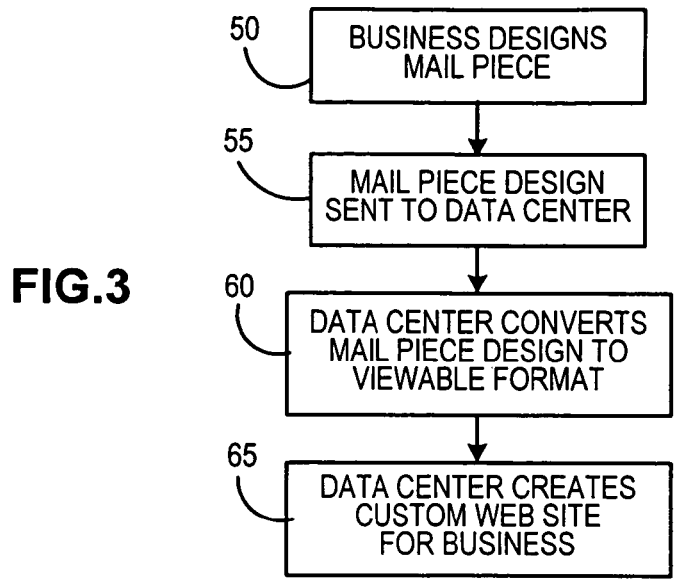
FIG. 3 illustrates in flow diagram form a process for implementing mail piece production according to the present invention.

The operation of the system 10 will be described with respect to the flow charts illustrated in FIGS. 3-5. Referring now to FIG. 3, in step 50 a business, such as, for example, business A of FIG. 2, prepares a design for one or more mail pieces that its sales representatives are authorized to use. Preferably, the mail pieces are postcards having printing on one or both sides, but could also be any other type of print media. For clarity, the operation of system 10 will be described with respect to business A; however, it should be understood that other businesses, such as, for example, business B and business N, will operate similarly. The design will include, for example, features such as color, font style and size, graphics, corporate logos, banners, placement of predefined information fields, i.e., contact information, customized information, etc. Since each design is centrally created and approved by the business, such as, for example, by the corporate marketing department, the business is assured of maintaining uniformity of the design of mailings, regardless of the business location from which the mailings are sent. However, the use of the predefined information fields for entry of customized information allows each mail piece to be customized while still maintaining the uniformity of the overall design. In addition, new designs can be easily introduced and made immediately available to all locations of a business simply by submitting the new designs to the data center 12. Furthermore, obsolete designs can be easily withdrawn from use, without the risk of obsolete designs being used after their removal.

In step 55, the business created designs are sent to the data center 12. This can be performed either manually, or, alternatively, electronically. Additionally, data center 12 may be further adapted to allow designs to be created on-line when accessed by an authorized party. Thus, for example, a user authorized by business A could access data base 30a of data center 12 via remote computer 16 and select or provide components to create a new design for a mail piece.

In step 60, data center 12 converts the designs received from the business into a format that is suitable for viewing on-line via a Web browser. Preferably, the format is a Web page that is created by a table-driven Active Server Pages (ASP) scripting environment that can combine HTML, scripts and reusable components to create dynamic Web pages, thereby enabling a single application to generate different looking Web sites for different businesses. The created Web pages can be viewed from a remote computer 16 that is running a Web browser software application. In step 65, the data center 12 creates a custom Web site for business A that includes the Web pages created by converting the mailing designs in step 60. The custom Web site is identified by a unique uniform resource locator (URL).

Figure 4:
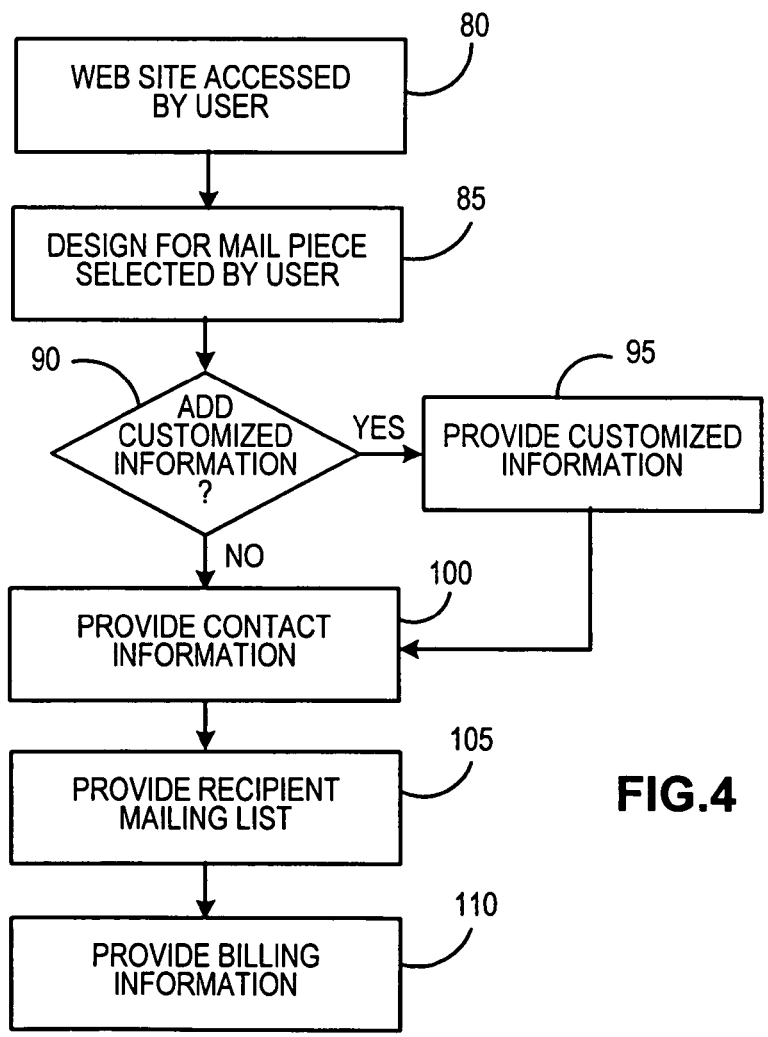
FIG. 4 illustrates in flow diagram form a process for ordering a mailing according to the present invention.

Referring now to FIG. 4, a method for selecting a direct mailing according to the present invention is illustrated in flow diagram form. In step 80, the custom Web site created for business A in step 65 is accessed by a user desiring to generate and send a direct mailing. The user could be, for example, a sales representative or marketing department employee desiring to send any type of promotional mailing. The user accesses the Web site via remote computer 16 and Internet 18 by entering the URL for the custom Web site for business A created by data center 12. As noted above, remote computer 16 includes and executes a Web browser software application, which allows the remote computer 16 to access Hypertext Markup Language (HTML) Web pages and other data on various Web servers, such as data center 12. Alternatively, the user could log into a Web site maintained by business A on the server 14 for business A, and click on a link provided therein to connect to the Web site created and maintained by data center 12. The user would then be redirected through the Internet 18 to data center 12.

Optionally, access to the Web site created by data center 12 for business A could be controlled by requiring a user identification as well as a password to access the Web site. A predetermined list of authorized users, identified by a user identification and password, would be provided from business A to data center 12. In this manner, only users authorized by business A will have access to the Web site maintained by data center 12 and can request generation of a direct mailing.

Once the user has accessed the Web site for business A maintained by data center 12, and, if necessary, supplied a proper user identification and password, the user can preview, via remote computer 16, the Web pages created by data center 12 from the designs supplied by business A. In step 85, one of the business defined designs for a mail piece is selected by the user. Once the mail piece has been selected, if there are sections of the mail piece that allow for customized information to be printed, in step 90 it is determined if the user desires to add customized information to the mail piece. Such customized information could include, for example, specific items on sale, personal messages to be included on the mail piece, or any other type of information that is unique to this mailing. If in step 90 it is determined that the user desires to add customized information, then in step 95 the user is prompted to enter the customized information. It should be understood that this information must fit within the parameters defined for the custom information field, i.e., the maximum number of characters that can be placed into the custom information area on the mail piece is predefined and cannot be modified by the user.

Once the customized information has been entered in step 95, or if the user did not desire to add customized information in step 90 or the mail piece selected by the user in step 85 does not have a field for entering customized information, then in step 100 the user is prompted to enter his contact information. The contact information will be printed on the mail piece in a predefined field and can include, for example, the user's name, office address, telephone and facsimile numbers, e-mail address or other location identification, store hours, etc. that will assist the mail piece recipient in contacting the user if so desired.

In step 105, the user is prompted to enter a recipient mailing list for the mail piece selected in step 85. The mailing list can be uploaded from remote computer 16 to data center 12 by the user, or the mailing list can be input by the user to data center 12 via remote computer 16. Alternatively, the mailing list can be selected from a list maintained by data center 12. Such lists maintained by data center 12 could be from previous mailings by the user, or supplied by business A. Additionally, the user could specify a targeting criteria for a list maintained by data center 12. Such targeting criteria could include, for example, a specific geographic area, previous customers, etc.

Once the recipient mailing list has been selected, downloaded or entered by the user in step 105, in step 110 the data center calculates the cost of printing the mailing, based on the number of mail pieces to be printed, and requests billing information from the user. Such billing information could include, for example, a purchase order number if the invoice is to be sent to the business A, credit card information if the user will pay for the mailing directly, or any other type of information necessary to effectuate the billing process as agreed to by data center 12 and business A. Also in step 110, the user is requested to input contact information to which a confirmation message will be sent upon actual printing and sending of the mailing from data center 12. Once the billing information has been entered, the user can review all of the selections made and make any changes or modifications as desired. The user will then be prompted to submit the complete order to data center 12, and a confirmation of the submitted order is returned to remote computer 16 by data center 12 confirming receipt of the order and indicating that the order will be printed and mailed within a predetermined time period, preferably within 2-3 days of the order.

As illustrated above, the ordering of a mailing can be performed from any remote terminal 16 having Internet 18 access, thereby allowing users the freedom to generate a mailing from any location. Additionally, the entire process of ordering a mailing can be performed in only a matter of minutes, thereby saving time for the user, since everything needed for the production of a promotional mailing is provided on one Web site, in a single workflow.

Figure 5:
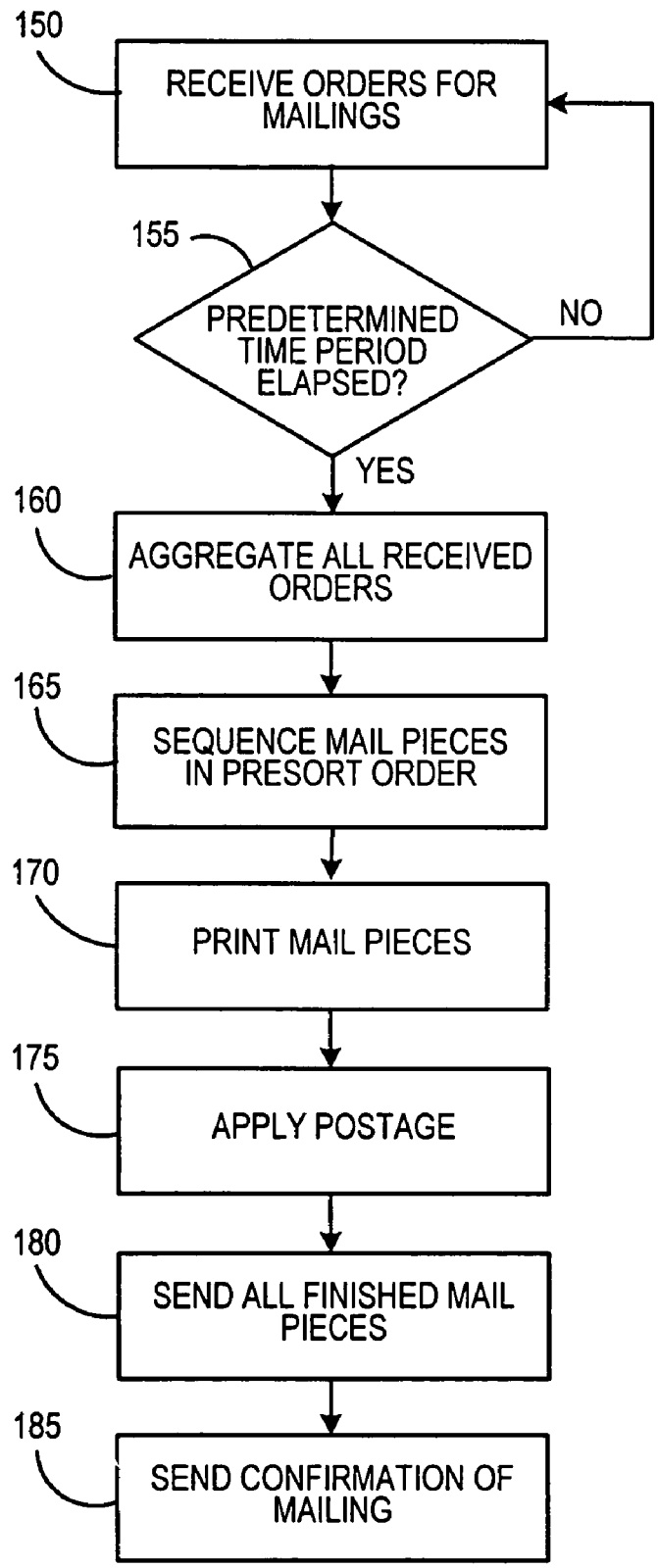
FIG. 5 illustrates in flow diagram form a process for preparing and sending mail pieces according to the present invention.

Referring now to FIG. 5, there is shown in flow diagram form the operation of the data center 12. In step 150, data center 12 is in a receive orders mode, i.e., data center 12 receives orders for mailings from any of the businesses A-N. In step 155, it is determined if a predetermined period of time has elapsed since data center 12 processed orders. Preferably, the period of time is approximately two to three days. If in step 155 it is determined that the predetermined period of time has not elapsed, the data center 12 continues in the receive orders mode in step 150. Once the predetermined period of time has elapsed, data center 12 will begin to process the mail piece orders and in step 160 all of the mail piece orders received during the previous receive order mode period will be aggregated into a single printing run. In step 165, all of the mail pieces in the aggregated orders are sequences in a presorted order based on addressing information provided in step 105. In accordance with the present invention, since the entire mailing is one large mailing formed of an aggregation of smaller individual mailings, it is possible to take advantage of postage discounts for the presorted aggregated mailing. Therefore, the aggregated mailing will have a lower postage cost per mail piece than each of the individual smaller mailings, thereby reducing the cost of such direct mailings for each business.

In step 170, all of the mail pieces in the aggregated orders are printed utilizing printer 36. Because printer 36 is a high performance printer, preferably each mail piece is a blank print media, and the entire mail piece, including text and graphics, is dynamically inserted into the print stream and printed on the mail piece. Thus, it is not necessary for any of the businesses A-N to provide data center 12 with stock mail pieces that already have pre-printed graphics or text, since printer 36 is capable of printing the entire design of the mail piece. This will also reduce the total cost of the mailing for each business, and eliminate any left-over pre-printed stock should a design of a mail piece become obsolete and no longer used. Specifically, in step 170, the design for each mail piece is printed on one or both sides of a postcard, along with the customized information, if any, provided in step 95, the contact information provided in step 100 and the recipient address culled from the recipient mailing list provided in step 105. The use of the data center 12 to print the mailing eliminates the need for each business to maintain its own high performance printer. Additionally, the costs to each business A-N associated with printing a mailing utilizing data center 12 will be less than if a commercial printing service was used.

In step 175, the appropriate postage is applied to each mail piece to create a finished mail piece. Postage indicia can be printed by printer 36, if desired, and in included as part of the printing of the mail pieces in step 170. In step 180, each finished mail piece is sent to its respective intended recipient via physical mail, such as, for example, by the United States Post Office (USPS) or any other postal service. In step 185, a confirmation of the sending of the ordered mail pieces is sent to the user that requested the order utilizing the information input by the user in step 110.

Thus, according to the present invention, a system and method is provided for businesses to prepare mail pieces for direct mailings in which the format and design of the mail pieces are centrally controlled, thereby eliminating the risk of unwanted changes to the design and content of the mail piece design. Additionally, the Web site maintained by the data center 12 is accessible via any remote computer with Internet access. The actual ordering of the mailing can be done in a matter of minutes, since everything needed for the production of a promotional mailing is provided on one Web site, in a single workflow, including selection from a catalog of business approved designs, customization of the mail pieces, targeted lists, printing, addressing, mailing, postage discounts and payment. The high performance printers utilized by the data center 12 to prepare the mail pieces ensures high quality printing and professional appearance. Furthermore, by aggregating several smaller individual mailings into a single large mailing, postal discounts can be utilized, thereby reducing the overall costs of each of the mailings.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for generating a mailing comprising the steps of:
   storing at a data center a design for each of a plurality of mail pieces, each of said designs being in a format viewable from a remote computer via a network;
   receiving, at said data center, an order for a plurality of pieces of a first mail piece design from said remote computer via said network;
   combining, using a processor at said data center, said order for said plurality of pieces of said first mail piece design with at least one other order for a plurality of pieces of a second mail piece design to produce a single print run;
   arranging, using said processor, said single print run in a presort sequence based on recipient addressing information for said plurality of pieces of said first and second mail piece design;
   printing each of said plurality of pieces of said first mail piece design and said plurality of pieces of said second mail piece design of said single print run in said arranged presort sequence on a corresponding print medium to produce a plurality of finished mail pieces in said presort sequence; and
   mailing said plurality of finished mail pieces.

2. The method according to claim 1, wherein said network is the Internet.

3. The method according to claim 1, wherein said step of receiving an order further comprises:
   receiving contact information for said plurality of pieces of said first mail piece design,
   wherein said contact information is printed on each of said plurality of pieces of said first mail piece design.

4. The method according to claim 1, wherein said step of receiving an order further comprises:
   receiving a recipient mailing list including a plurality of names,
   wherein a respective one of said plurality of names is printed on a corresponding one of said plurality of pieces of said first mail piece design.

5. The method according to claim 1, wherein said step of receiving an order further comprises:
   receiving customized information to be printed on said plurality of pieces of said first mail piece design.

6. The method according to claim 1, wherein said print medium is a post card having a first and second side.

7. The method according to claim 6, wherein said step of printing further comprises:
   printing on said first and second side of said postcard.

8. The method according to claim 1, wherein said first mail piece design is for a first business, and said second mail piece design is for a second business.

9. A system for producing a mailing including a plurality of mail pieces, said system comprising:
   a remote computer coupled to a network;
   a data base for storing a design for each of a plurality of mail pieces;
   a processor coupled to said data base, said processor being communicatively coupled to said network, said remote computer communicating with said processor via said network to provide an order for a plurality of mail pieces having a first design, said processor combining said order for said plurality of mail pieces having said first design with at least one other order for a plurality of pieces of a second design to produce a single print run and arranging said single print run in a presort sequence based on recipient addressing information for said plurality of pieces of said first and second mail piece design; and
   a printer coupled to said processor to print each of said plurality of pieces of said first design and said plurality of pieces of said second design of said single print run in said arranged presort sequence on a corresponding print medium to produce a plurality of finished mail pieces.

10. The system according to claim 9, wherein said network is the Internet.

* * * * *